United States Patent

[11] 3,633,018

[72] Inventor Huei Ling
San Jose, Calif.
[21] Appl. No. 886,236
[22] Filed Dec. 18, 1969
[45] Patented Jan. 4, 1972
[73] Assignee International Business Machines Corporation Armonk, N.Y.

[54] DIGITAL DIVISION BY RECIPROCAL CONVERSION TECHNIQUE
5 Claims, 4 Drawing Figs.

[52] U.S. Cl. .................................................. 235/164, 235/156
[51] Int. Cl. .................................................. G06f 7/52
[50] Field of Search .................................................. 235/156, 164

[56] References Cited
UNITED STATES PATENTS

| | | | |
|---|---|---|---|
| 3,234,369 | 2/1966 | Roth et al. .................... | 235/164 |
| 3,508,038 | 4/1970 | Goldschmidt et al. ......... | 235/164 |

*Primary Examiner*—Malcolm A. Morrison
*Assistant Examiner*—David H. Malzahn
*Attorneys*—Hanifin and Jancin and Peter R. Leal

ABSTRACT: A reciprocal conversion technique for obtaining the quotient of two numbers and the reciprocal of a number. A predetermined number of leading bits of the mantissa of the denominator is used as an entry into a table used for locating the required number of shifts and adds or shifts and subtracts to form a standard from of a denominator. Significant precision control and the semireciprocal of the normalized fraction is formed in successive multiplication steps. The reciprocal of the normalized fraction is formed and the quotient can thereafter be determined with a final multiplication step.

INVENTOR.
HUEI LING
BY Peter R. Leal
ATTORNEY

DIGITAL DIVISION BY RECIPROCAL CONVERSION TECHNIQUE

BACKGROUND OF INVENTION

1. Field of the Invention

This invention relates to a digital computer's arithmetic unit, and more particularly to digital system and methods for obtaining the reciprocal of a number and the quotient of two numbers.

2. Description of Prior Art

Division is an infinite process. In order to reduce the iteration cycle required to obtain the quotient in computers, many methods have been proposed. Among them, the multiple subtraction process was used in earlier machines, though it is generally not in use today. The use of Newton's method as mentioned by Rabinowitz (CACM 4, p. 98, 1961) and Goltlieb (*High-Speed Data Processing* p. 51–52) for evaluating the reciprocal of a number was extensively used in the early computers. The nonrestoring division method used in the Stretch computer apparently is relatively slow. Recently D. Knuth in his book "Art of Computer Programming, " Seminumerical Algorithms, Vol. II p. 275, Addison-Wesley Publishing Company, 1969, suggested a fast multiplication routine to perform the division. However, due to the requirement of computing, the initial approximation, and the varied iteration cycles, this method is not suitable for high-performance machines. Since multiplication can be fast as mentioned by Anderson's paper (IBM Journal of Res. and Dev. V. 11 No. 1 p. 34–53, 1967) and by Ling's presentation Computer Multiplication Algorithm and its Implementation, IEEE Workshop on theory of Computer Arithmetic, June 16, 1969), it has generally become the trend to express the division in terms of finite multiplication steps. The latter presentation is documented in the publication on "High-Speed Computer Multiplication using a Multiple Bit Decoding Algorithm," by H. Ling, IBM Research Report, RJ 580, June 20, 1969.

The denominator quadratic convergence method as mentioned by Anderson, used in the IBM 360/91, and the 360/195, is generally considered to be the best method today. However, with the requirement of two high-speed multipliers (one for the denominator, the other for the numerator), one requires four multiplies in parallel in order to obtain 32-bit precision. Comparatively speaking, therefore, the method is not fast. A faster and more flexible scheme is presented in this invention, and at a reduced hardware cost.

SUMMARY OF THE INVENTION

My invention provides a reciprocal convergence technique for obtaining the quotient of the division and the reciprocal of a number. Using $\delta_2\delta_3\delta_4\delta_5\delta_6\delta_7\delta_8$ of the eight leading bit of the mantissa of the denominator as an entry to a table, the required number of right shift and Add or Subtract are stored at registers MR(+) and MR(−). After performing the required shift and add or shift and subtract, the standard form of the denominator is formed. The significant precision control array $S_1'$ is formed with one simple multiplication. The semireciprocal of a normalized fraction is formed with one more multiplication, after reset stage, the reciprocal of a normalized fraction is formed. The quotient of the division is formed with one more multiplication.

My invention can be used to find the reciprocal of a number with two multiplications, and the quotient of two numbers with three multiplications. Compared to the existing fastest methods, my invention shows not only a gain in speed, but also a saving in hardware.

DESCRIPTION OF PREFERRED EMBODIMENT

Underlying Theory

Figure 1:
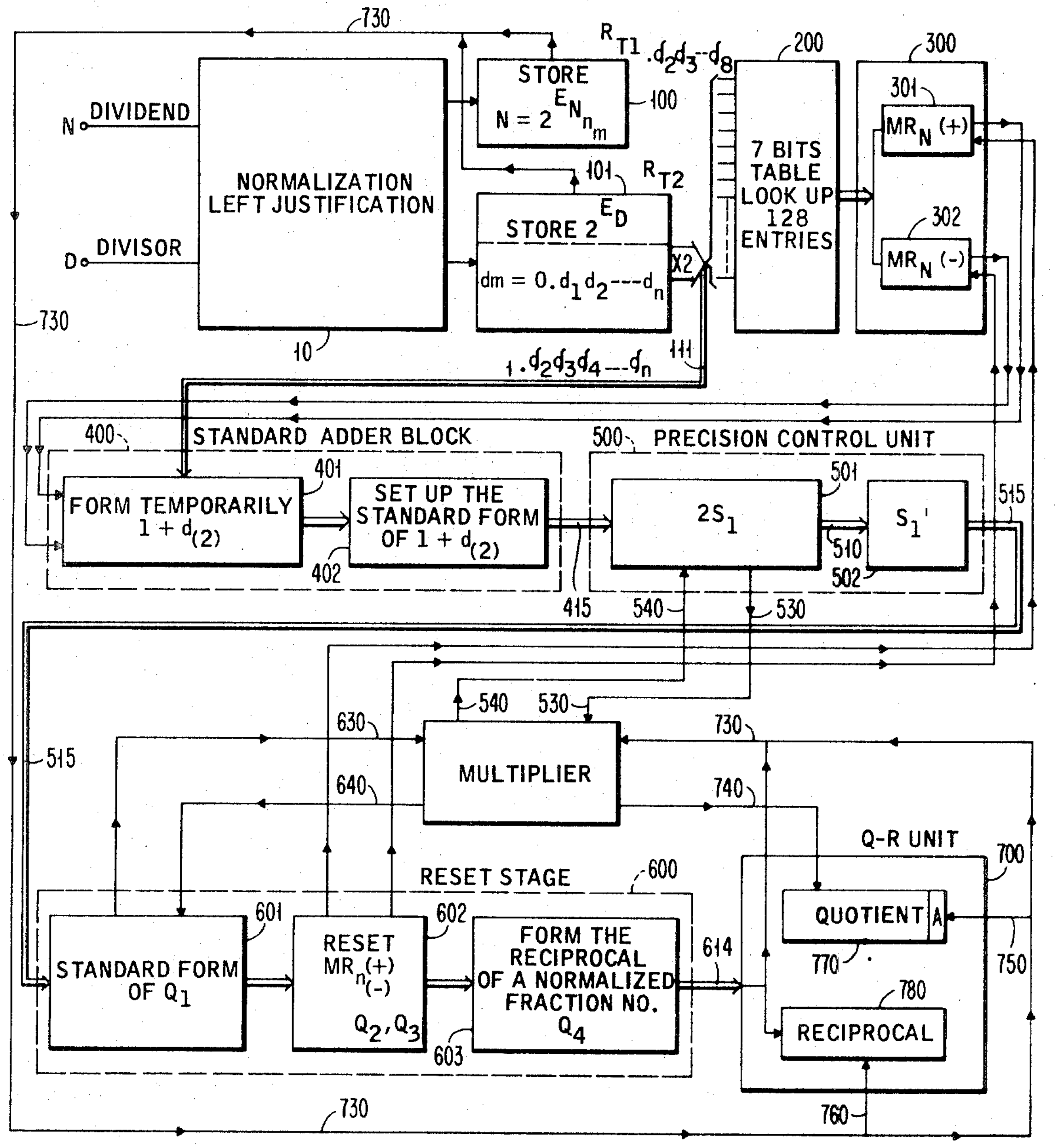
FIG. 1 is a data flow diagram of an implementation of my invention using the method of reciprocal convergence technique.

An embodiment of my invention will be described. In the embodiment, the dividend and the divisor will both be normalized, that is, justified such that the binary point of each number are aligned such that there is a "one" in the high order of each number. The following description of the underlying theory of my invention will be helpful in understanding the embodiments to be described. While the invention is described with reference to the binary number system, it will be recognized by those of ordinary skill in the art that the invention can be implemented in other number system without departing from the spirit and the scope of the invention.

Let N and D be the numerator and denominator whose quotient Q is being sought. (We note that with proper scaling, N and D can be integers or even general floating-point numbers). Then $$Q=N(1/D) \qquad (1)$$

Since $1/D$ generally contains an infinite number of terms, it is necessary to collect all the significant terms (commonly known as precision) with a minimum amount of effort. For example, $R=1/D(1-2^{-n})$, where $R$ is the approximate reciprocal of $D$; $n$ is the required number of precision bits.

One of the equation obtained in the early paper (the inventor's presentation to the IEEE Workshop as mentioned above) allowing for multiplication to be handled by blocks, can also be used to obtain the reciprocal of the denominator. Let $$S_1=3/2\,d-f(d) \qquad (2)$$

where $d$ is the mantissa of $D$ $$d=0.\,\delta_1\delta_2\delta_3\ldots\delta_n(\delta_1=1 \text{ in binary}) \qquad (2.1)$$

and $f(d)=d/2(1+d)$ (2.2)

since, from equation (2.1) it is known that $\delta_1$ is a 1 in binary in the most significant binary position, the equation for $d$ can be written in a slightly different form;

$$d=0.1\,\delta_2\delta_3\ldots\delta_n$$
$$=0.100\ldots0+0.0\,\delta_2\delta_3\ldots\delta_n$$
$$d=0.1+0.1(.\delta b2\delta_3\ldots\delta_n) \qquad (2.3)$$

Since we are working in binary, 0.1 is one-half so that 2.3 can be rewritten $$d=1/2+1/2\,(.\delta_2\delta_3\ldots\delta_n)$$

or $$d=0.5+d_{(2)}/2 \qquad (3)$$

where $d_{(2)}=(0.\delta_2\delta_3\delta_4\ldots\delta_n)$ By substituting equation (3) into (2), we have $$S_1=\frac{3}{2}\left(\frac{1}{2}+\frac{d_{(2)}}{2}\right)-f\left(0.5+\frac{d_{(2)}}{2}\right) \qquad (3.1)$$

since $f(d)=d/2\,(1+d)$ from equation (2.2) and $$d=\frac{1}{2}+\left(\frac{d_{(2)}}{2}\right)$$

from equation (3), then $$f\left(\frac{1}{2}+\frac{d_{(2)}}{2}\right)=\frac{\left(\frac{1}{2}+\frac{d_{(2)}}{2}\right)}{2}\left[1+\left(\frac{1}{2}+\frac{d_{(2)}}{2}\right)\right]$$

$$f\left(\frac{1}{2}+\frac{d_{(2)}}{2}\right)=\frac{1}{2}\left(\frac{1}{2}+\frac{d_{(2)}}{2}\right)\left(1+\frac{1}{2}+\frac{d_{(2)}}{2}\right)$$

so that equation (3.1) becomes:

$$S_1=\frac{3}{2}\left(\frac{1}{2}+\frac{d_{(2)}}{2}\right)-\frac{1}{2}\left(\frac{1}{2}+\frac{d_{(2)}}{2}\right)\left(1+\frac{1}{2}+\frac{d_{(2)}}{2}\right) \qquad (3.2)$$

Multiplying both sides by 2 and simplifying:

$$2S_1=3\left(\frac{1}{2}+\frac{d_{(2)}}{2}\right)-\left(\frac{1}{2}+\frac{d_{(2)}}{2}\right)\left(1+\frac{1}{2}+\frac{d_{(2)}}{2}\right)$$

$$=3\left(\frac{1}{2}+\frac{d_{(2)}}{2}\right)-\frac{1}{2}\left(1+\frac{1}{2}+\frac{d_{(2)}}{2}\right)-\frac{d_{(2)}}{2}\left(1+\frac{1}{2}+\frac{d_{(2)}}{2}\right)$$

$$=3\left(\frac{1}{2}+\frac{d_{(2)}}{2}\right)-\frac{1}{2}\left(1+\frac{1}{2}+\frac{d_{(2)}}{2}\right)-\frac{d_{(2)}}{2}-\frac{d_{(2)}}{2}\left(\frac{1}{2}+\frac{d_{(2)}}{2}\right)$$

$$=3\left(\frac{1}{2}+\frac{d_{(2)}}{2}\right)-\frac{1}{2}\left(1+\frac{1}{2}+\frac{d_{(2)}}{2}\right)-\frac{d_{(2)}}{2}-\frac{d_{(2)}}{4}(1+d_{(2)})$$

$$2S_1=3\left(\frac{1}{2}+\frac{d_{(2)}}{2}\right)-\frac{1}{2}\left(1+\frac{1}{2}+\frac{d_{(2)}}{2}\right)-\frac{d_{(2)}}{2}-\frac{1}{2}\left[\frac{d_{(2)}}{2}(1+d_{(2)})\right] \qquad (3.3)$$

From equation (2.2) above, it can be seen that the last term of equation (3.3) is equivalent to $$-\frac{1}{2}[f(d_{(2)})]$$

so that equation (3.3) can be rewritten as $$2S_1=\frac{3}{2}+\frac{3d_{(2)}}{2}-\frac{1}{2}-\frac{1}{4}-\frac{d_{(2)}}{4}-\frac{d_{(2)}}{2}-\frac{1}{2}[f(d_{(2)})] \qquad (3.4)$$

Collecting terms and continuing, $$2S_1=\frac{3}{4}+\frac{3d_{(2)}}{4}-\frac{1}{2}[f(d_{(2)}]$$

$$=\frac{3}{4}[1+d_{(2)}]-\frac{1}{2}[f(d_{(2)})]$$

or $2S_1=0.75\ (1+d_{(2)})-0.5f(d_{(2)}$ (4)

Dividing both side of equation (4) by $1+d_{(2)}$, we have $$\frac{2S_1}{1+d_{(2)}}=.75-\frac{.5f(d_{(2)})}{1+d_{(2)}}$$

but $f(d_{(1)})=d_{(2)}/2\ (1+d_{(2)})$ from (2.2) so that $$\frac{2S_1}{1+d_{(2)}}=\frac{3}{4}-\frac{1}{2(1+d_{(2)})}\left[\frac{d_{(2)}}{2}(1+d_{(2)})\right]$$

or $$\frac{2S_1}{1+d_{(2)}}=\frac{3}{4}-\frac{1}{4}d_{(2)} \qquad (4a)$$

Let $2S_2=3(2S_1)-2f(2S_1)$ (5.1)

$2S_3=3(2S_2)-2f(2S_2)$ (5.2)

$2S_4=3(2S_3)-2f(2S_3)$ (5.3) etc.

By dividing equation (5.1) on both sides by $1+d_{(2)}$, we obtain $$\frac{2S_2}{1+d_{(2)}}=\frac{3(2S_1)}{1+d_{(2)}}-2\frac{f(2S_1)}{1+d_{(2)}} \qquad (5.1a)$$

But from (2.2 it is seen that $f(2S_1)=((2S_1)/(2))\ (1+2S_1)$ (5.1$b$)

Therefore substituting (5.1$b$) into (5.1$a$) we have:

$$\frac{2S_2}{1+d_{(2)}}=3\left[\frac{2S_1}{1+d_{(2)}}\right]-\frac{2}{(1+d_{(2)})}\left(\frac{2S_1}{2}\right)(1+2S_1)$$

$$=3\left[\frac{2S_1}{1+d_{(2)}}\right]-\frac{2S_1}{(1+d_{(2)})}-\frac{2S_1(2S_1)}{(1+d_{(2)})}$$

$$=\frac{2S_1}{1+d_{(2)}}[3-1-2S_1]$$

$$=\frac{2S_1}{1+d_{(2)}}[2-2S_1]$$

$$=\frac{2S_1}{1+d_{(2)}}[2][1-S_1]$$

so that

Substituting equation (4$a$) in equation (6.1) we have $$\frac{2S_2}{1+d_{(2)}}=\left(\frac{3}{2}-\frac{1}{2}d_{(2)}\right)S_1' \qquad (6.1a)$$

By dividing equation (5.2) on both sides by $1+d_{(2)}$ and simplifying terms as was done for equation (6.1)

$$\frac{2S_3}{1+d_{(2)}}=\frac{2S_2}{1+d_{(2)}}2S_2' \qquad (6.2)$$

Substituting equation (6.1$a$) into equation (6.2) we have $$\frac{2S_3}{1+d_{(2)}}=\left[\frac{3}{2}-\frac{1}{2}d_{(2)}\right]S_1'2S_2' \qquad (6.2a')$$

multiplying both sides of (6.1) by $1+d_{(2)}$, we have $2S_2=2S_1\,2S'_1$ so that $S_2=2S_1S'_1$ (6.2$a''$)

by substituting (6.2$a''$), into (6.2$a'$ we have $$\frac{2S_3}{1+d_{(2)}}=\left(\frac{3}{2}-\frac{1}{2}d_{(2)}\right)S_1'2(2S_1S_1') \qquad (6.2a)$$

a generalized equation of the above form can be derived as follows. By inspection of equations (5.1), (5.2), and (5.3), it can be seen that in general:

$2S_n=3(2S_{n-1})-2f(2S_{n-1})$ (5.$n$)

Dividing both sides of (5.$n$) by $(1+d_{(2)}$, we have $$\frac{2S_n}{1+d_{(2)}}=\frac{3(2S_{n-1})}{1+d_{(2)}}-\frac{2f(2S_{n-1})}{1+d_{(2)}} \qquad (5.nl)$$

but by inspection of (2.2) it is seen that $f(2S_{n-1})=S_{n-1}(1+2S_{n-1})$ (5.$n$2) Substituting (5.$n$2) into (5.$n$1) we have $$\frac{2S_n}{1+d_{(2)}}=\frac{3(2S_{n-1})}{1+d_{(2)}}-\frac{2}{1+d_{(2)}}-[S_{n-1}]\,[1+2S_{n-1}]$$

$$=\frac{2(S_{n-1})}{1+d_{(2)}}[3-1-2S_{n-1}]$$

$$=\frac{2S_{n-1}}{1+d_{(2)}}[2-2S_{n-1}]$$

$$=\frac{2S_{n-1}}{1+d_{(2)}}[2]\,[1-S_{n-1}]$$

But, as above, $[1-S_{n-1}]$can be written as $S_{n-1}'$ so that $$\frac{2S_n}{1+d_{(2)}}=\frac{2S_{n-1}}{1+d_{(2)}}2(S_{n-1})' \qquad (6.2n)$$

Equation (6.1) to (6.2n) show that if $1+d_{(2)}$, hereinafter referred to as the standard form of the denominator, has eight leading ones in binary, then $2S_1$ is guaranteed to have 16 leading ones. Since $S_P$ will have 8* $2P$ leading ones, when the precision $n$ is specified, $P$ is automatically decided by $n=16P$. For example, if a single precision 32-bit quotient is required, then $S_2$ is selected. Since 16-bit and 32-bit machines are most popular, the use of $S_1$ is generally sufficient. Let us rewrite $S_1$ and $S_2$ in the following explicit form:

$$\frac{2S_1}{1+d_{(2)}}=\frac{3}{4}-\frac{1}{4}d_{(2)} \qquad (7)$$

The above equation defines the first word approximation of the reciprocal of the normalized fraction for 16-bit precision.

$$\frac{2S_2}{1+d_{(2)}}=\left(\frac{3}{4}-\frac{1}{4}d_{(2)}\right)\cdot 2(S_1') \qquad (8)$$

The above equation defines the second order approximation of the reciprocal of the normalized fraction for 32-bit precision.

For larger machines, 64-bit double precision is sometimes needed and equation (6.2) can be written into $$\frac{2S_3}{1+d_{(2)}}=\left(\frac{3}{2}-\frac{1}{2}d_2\right)S_1'22S_1S_1'' \qquad (9)$$

The above equation defines the third order approximation of the reciprocal of the normalized fraction for 64-bit precision. For multiple precision equation (6.$n$) will generally apply.

The normalized denominator will at least have a single leading one. If we use it to find $S_1$, then $2S_1$ in binary can have from at least two leading ones up to to any number of leading ones The precision of $1/1+d_{(2)}$ becomes unpredictable. In order to obtain the minimum number of required ones in $2S_1$ within finite time, more leading ones in $1+d_{(2)}$ (such as 1.1111111000...) are needed. The reasons for choosing eight leading ones are (a) one can use a small table lookup. This table contains only 256 entries, each entry will give an indication of the number of preshifts and adds required. This operation is completed by look-ahead before $1+d_{(2)}$ reaches the execution unit. It can be shown that in the worst case, no more than five fixed point additions are needed (average 2.9 additions). (b) For this size table, one can always replaced it by a logic implementation. Eight fan-in fan-out high-speed chips are available, therefore, the selection of eight leading ones is decided for this implementation, but it is obvious to one of ordinary skill that a larger table can be used, according to the designer's choice, without departing from the spirit or the scope of the invention.

Figure 2:
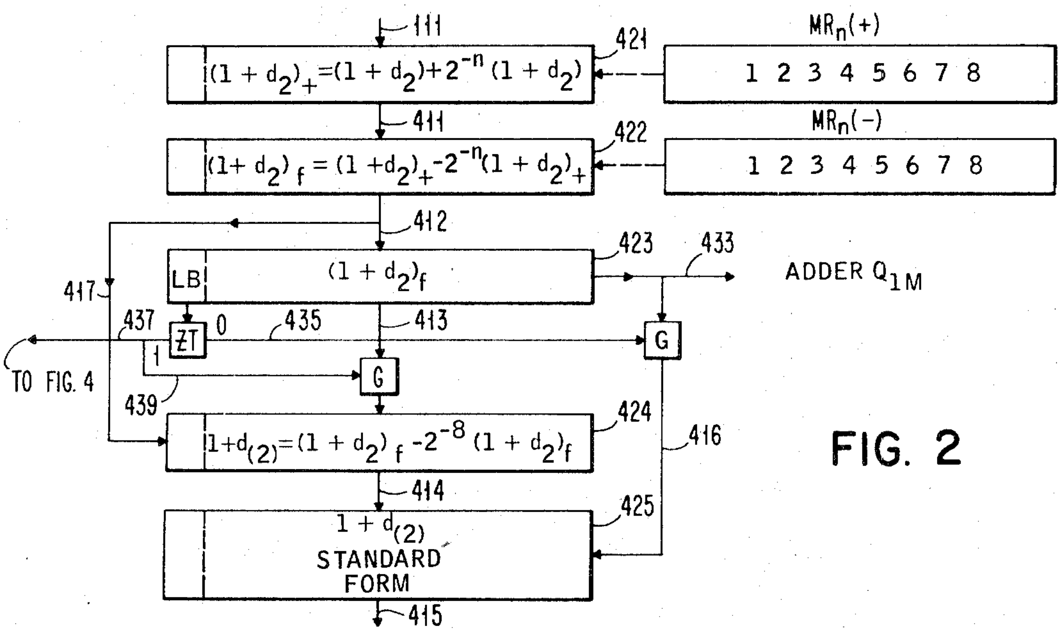
FIG. 2 is a representation of the procedure and the technique to obtain the standard from $1+d_{(2)}$ of FIG. 1.
Figure 3:
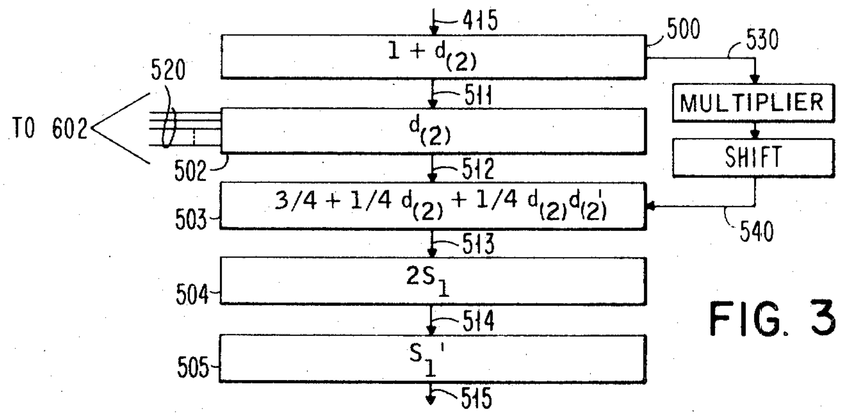
FIG. 3 is a representation of the procedure to obtain the precision significant number $S_1'$ of FIG. 1.
Figure 4:
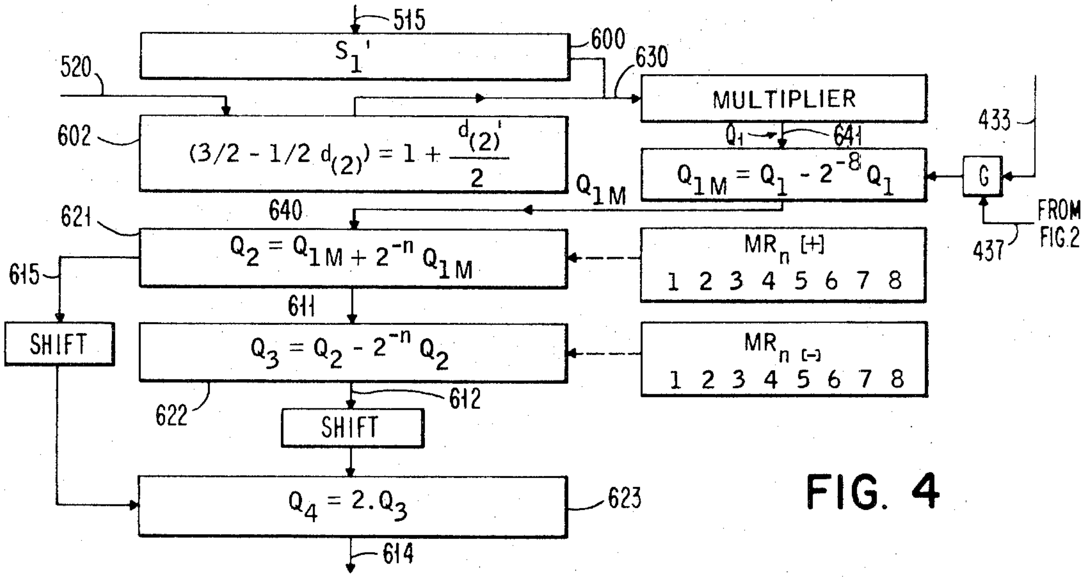
FIG. 4 is a representation of the formation of reciprocal a normalized fraction number $Q_4$ and its relation with the reset procedure of FIG 1.

One inherent problem is that we cannot test the entire denominator ($n$ bits) nor can we implement an $n$-fan-in and fan-out logic circuit to indicate the number of preshifts required. By examining only the leading eight bits to perform preshift, overfilling may occur, such as $1+d_{(2)}$ 10.0000000... instead of 1.1111111... Therefore, before further processing, it is necessary to change the overfilled member to the standard form (1.1111111...). This can simply be done by subtracting from the overfilled number the eight right-shift of the overfilled number. FIG. 1 gives an overview of the data flow of this invention. FIGS. 2, 3 and 4 will describe this invention in more detail.

STRUCTURE

An embodiment of my invention will now be described. In this embodiment, the standard form of the denominator is obtained.

Referring now to FIG. 1, the dividend and divisor are normalized in well known normalization means 10. First, the dividend $$N=2^{E_N}n_m$$

is stored at register $R_{T1}$ 100, the divisor $$D=2^{E_D}d_m$$

is stored at register $R_{T2}$ 101, the mantissa of the denominator is left shifted 1 place, meaning that the denominator is multiplied by 2, call it $1+d_2$, which is equal to $1.\delta_2\delta_3 \cdots \delta_n$. This data is set to the standard adder block 400 via the data buss 111. The seven leading bits of $d_2$, simply $\delta_2\delta_3\delta_4\delta_5\delta_6\delta_7\delta_8$, are used as an entry into well-known table lookup means 200. The output of this table lookup will give the necessary steps of right shift and add, or right shift and lookup information. Since table lookup means are well-known, the structure of it will not be described here. However, the entries of the table are seen in table 1. These entries show the relation between the seven leading bits ($\delta_2\delta_3 \cdots \delta_8$) of the denominator and the required number of right shift and adds and subtracts to give the desired eight (in this embodiment) leading 1's. For example, viewing the seventh table entry, namely:

| $\delta_2$ $\delta_3$ $\delta_4$ $\delta_5$ $\delta_6$ $\delta_7$ $\delta_8$ | 1 | 2 | 3 | 4 | 5 | 6 | 7 | 8 |
|---|---|---|---|---|---|---|---|---|
| 1 0 1 0 0 0 0 | | | + | + | + | | | − |

it can be seen that since the first + is under "3," you shift right 3 and add. Then, since the next + is under "4" which is 1 place away from the previous +, you shift right 1 place and add again. Then, since the next + is under "5" which is 1 place away from the previous add, you shift right 1 and

TABLE I

| Leading 8 bits of the denominator $d_1$=1 always | | | | | | | Required number of right shift adds or subtracts | | | | | | | |
|---|---|---|---|---|---|---|---|---|---|---|---|---|---|---|
| $d_2$ | $d_3$ | $d_4$ | $d_5$ | $d_6$ | $d_7$ | $d_8$ | 1 | 2 | 3 | 4 | 5 | 6 | 7 | 8 |
| 0 | 0 | 0 | 0 | 0 | 0 | 0 | + | + | | + | | | | |
| 1 | 0 | 0 | 0 | 0 | 0 | 0 | | + | | + | | | | |
| 0 | 1 | 0 | 0 | 0 | 0 | 0 | + | | | + | | | | |
| 1 | 1 | 0 | 0 | 0 | 0 | 0 | | | + | | | + | | |
| 0 | 0 | 1 | 0 | 0 | 0 | 0 | + | | + | | + | + | | + |
| 0 | 1 | 1 | 0 | 0 | 0 | 0 | | + | + | | + | | | |
| 1 | 0 | 1 | 0 | 0 | 0 | 0 | | | + | + | + | | | − |
| 1 | 1 | 1 | 0 | 0 | 0 | 0 | | | | + | | | | |
| 0 | 0 | 0 | 1 | 0 | 0 | 0 | + | + | | | | | | |
| 0 | 0 | 1 | 1 | 0 | 0 | 0 | + | | + | | | − | | |
| 0 | 1 | 0 | 1 | 0 | 0 | 0 | + | | | | | + | | |
| 0 | 1 | 1 | 1 | 0 | 0 | 0 | | + | + | | | − | | + |
| 1 | 0 | 0 | 1 | 0 | 0 | 0 | | + | | | | + | + | |
| 1 | 0 | 1 | 1 | 0 | 0 | 0 | | | + | | + | + | | + |
| 1 | 1 | 0 | 1 | 0 | 0 | 0 | | | | + | + | | | + |
| 1 | 1 | 1 | 1 | 0 | 0 | 0 | | | | | + | | | |
| 0 | 0 | 0 | 0 | 1 | 0 | 0 | + | + | | | + | | | |
| 0 | 0 | 0 | 1 | 1 | 0 | 0 | + | | + | + | | + | | + |
| 0 | 0 | 1 | 0 | 1 | 0 | 0 | + | | + | | | + | + | |
| 0 | 0 | 1 | 1 | 1 | 0 | 0 | + | | | + | + | | | − |
| 0 | 1 | 0 | 0 | 1 | 0 | 0 | + | | | | + | | + | |
| 0 | 1 | 0 | 1 | 1 | 0 | 0 | | + | + | + | | | | − |
| 0 | 1 | 1 | 0 | 1 | 0 | 0 | | + | + | | | | + | |
| 0 | 1 | 1 | 1 | 1 | 0 | 0 | | + | | + | | + | + | |
| 1 | 0 | 0 | 0 | 1 | 0 | 0 | | + | | | + | | + | + |
| 1 | 0 | 0 | 1 | 1 | 0 | 0 | | + | | | | | | |
| 1 | 0 | 1 | 0 | 1 | 0 | 0 | | | + | + | | | + | |
| 1 | 0 | 1 | 1 | 1 | 0 | 0 | | | + | | + | | | |
| 1 | 1 | 0 | 1 | 1 | 0 | 0 | | | | + | | + | | + |
| 1 | 1 | 0 | 1 | 1 | 0 | 0 | | | | + | | + | | + |
| 1 | 1 | 1 | 0 | 1 | 0 | 0 | | | | | + | + | | |
| 1 | 1 | 1 | 1 | 1 | 0 | 0 | | | | | | + | | |
| 0 | 0 | 0 | 0 | 0 | 1 | 0 | + | + | | | + | + | | |
| 0 | 0 | 0 | 0 | 1 | 1 | 0 | + | + | | | | + | | |
| 0 | 0 | 0 | 1 | 0 | 1 | 0 | + | + | | | − | | | |
| 0 | 0 | 0 | 1 | 1 | 1 | 0 | + | | + | + | | | | + |
| 0 | 0 | 1 | 0 | 0 | 1 | 0 | + | | + | | + | | | + |
| 0 | 0 | 1 | 0 | 1 | 1 | 0 | + | | + | | | | + | |
| 0 | 0 | 1 | 1 | 0 | 1 | 0 | + | | | + | + | | + | |
| 0 | 0 | 1 | 1 | 1 | 1 | 0 | + | | | + | | + | | |
| 0 | 1 | 0 | 0 | 0 | 1 | 0 | + | | | | + | + | | + |
| 0 | 1 | 0 | 0 | 1 | 1 | 0 | + | | | | + | | | − |
| 0 | 1 | 0 | 1 | 0 | 1 | 0 | + | | | | | | | |
| 0 | 1 | 0 | 1 | 1 | 1 | 0 | | + | + | | + | | + | + |
| 0 | 1 | 1 | 0 | 0 | 1 | 0 | | + | + | | | + | | + |
| 0 | 1 | 1 | 0 | 1 | 1 | 0 | | + | + | | | | | |
| 0 | 1 | 1 | 1 | 0 | 1 | 0 | | + | | + | + | | | + |
| 0 | 1 | 1 | 1 | 1 | 1 | 0 | | + | | + | | | + | + |
| 1 | 0 | 0 | 0 | 0 | 1 | 0 | | + | | + | | | − | |
| 1 | 0 | 0 | 0 | 1 | 1 | 0 | | + | | | + | | | |
| 1 | 0 | 0 | 1 | 0 | 1 | 0 | | + | | | | | + | + |
| 1 | 0 | 0 | 1 | 1 | 1 | 0 | | + | | | − | | + | + |
| 1 | 0 | 1 | 0 | 0 | 1 | 0 | | | + | + | | + | | + |
| 1 | 0 | 1 | 0 | 1 | 1 | 0 | | | + | + | | | | |
| 1 | 0 | 1 | 1 | 0 | 1 | 0 | | | + | | + | | + | + |
| 1 | 0 | 1 | 1 | 1 | 1 | 0 | | | + | | | + | + | |
| 1 | 1 | 0 | 0 | 0 | 1 | 0 | | | + | | | | | + |
| 1 | 1 | 0 | 0 | 1 | 1 | 0 | | | + | | | − | | |
| 1 | 1 | 0 | 1 | 0 | 1 | 0 | | | | + | + | | | − |
| 1 | 1 | 0 | 1 | 1 | 1 | 0 | | | | + | | | + | + |
| 1 | 1 | 1 | 0 | 0 | 1 | 0 | | | | + | | | − | |
| 1 | 1 | 1 | 0 | 1 | 1 | 0 | | | | | + | | + | |
| 1 | 1 | 1 | 1 | 0 | 1 | 0 | | | | | | + | + | |
| 1 | 1 | 1 | 1 | 1 | 1 | 0 | | | | | | | + | |
| 0 | 0 | 0 | 0 | 0 | 0 | 1 | + | + | | + | | | − | |
| 0 | 0 | 0 | 0 | 0 | 1 | 1 | + | + | | | + | | + | |
| 0 | 0 | 0 | 0 | 1 | 0 | 1 | + | + | | | | + | + | |
| 0 | 0 | 0 | 0 | 1 | 1 | 1 | + | + | | | | | + | |
| 0 | 0 | 0 | 1 | 0 | 0 | 1 | + | + | | | − | | + | |
| 0 | 0 | 0 | 1 | 0 | 1 | 1 | + | | + | + | | + | + | |
| 0 | 0 | 0 | 1 | 1 | 0 | 1 | + | | + | + | | | + | + |
| 0 | 0 | 0 | 1 | 1 | 1 | 1 | + | | + | + | | | − | |
| 0 | 0 | 1 | 0 | 0 | 0 | 1 | + | | + | | + | | + | + |
| 0 | 0 | 1 | 0 | 0 | 1 | 1 | + | | + | | + | | | |
| 0 | 0 | 1 | 0 | 1 | 0 | 1 | + | | + | | | + | | |
| 0 | 0 | 1 | 0 | 1 | 1 | 1 | + | | + | | | | | + |
| 0 | 0 | 1 | 1 | 0 | 0 | 1 | + | | + | | | − | | |
| 0 | 0 | 1 | 1 | 0 | 1 | 1 | + | | | + | + | | | + |
| 0 | 0 | 1 | 1 | 1 | 0 | 1 | + | | | + | | + | | + |
| 0 | 0 | 1 | 1 | 1 | 1 | 1 | + | | | + | | | + | |
| 0 | 1 | 0 | 0 | 0 | 0 | 1 | + | | | + | | | | − |
| 0 | 1 | 0 | 0 | 0 | 1 | 1 | + | | | | + | | + | + |
| 0 | 1 | 0 | 0 | 1 | 0 | 1 | + | | | | + | | | |
| 0 | 1 | 0 | 0 | 1 | 1 | 1 | + | | | | | + | | + |
| 0 | 1 | 0 | 1 | 0 | 0 | 1 | + | | | | | | + | |
| 0 | 1 | 0 | 1 | 0 | 1 | 1 | + | | | − | | | | |
| 0 | 1 | 0 | 1 | 1 | 0 | 1 | | + | + | | + | + | | + |
| 0 | 1 | 0 | 1 | 1 | 1 | 1 | | + | + | | + | | + | |
| 0 | 1 | 1 | 0 | 0 | 0 | 1 | | + | + | | + | | | − |
| 0 | 1 | 1 | 0 | 0 | 1 | 1 | | + | + | | | + | | |
| 0 | 1 | 1 | 0 | 1 | 0 | 1 | | + | + | | | | | + |
| 0 | 1 | 1 | 0 | 1 | 1 | 1 | | + | + | | | − | | + |
| 0 | 1 | 1 | 1 | 0 | 0 | 1 | | + | | + | + | | + | |
| 0 | 1 | 1 | 1 | 0 | 1 | 1 | | + | | + | + | | | − |
| 0 | 1 | 1 | 1 | 1 | 0 | 1 | | + | | + | | + | | + |
| 0 | 1 | 1 | 1 | 1 | 1 | 1 | | + | | + | | | + | |
| 1 | 0 | 0 | 0 | 0 | 0 | 1 | | + | | + | | | | − |
| 1 | 0 | 0 | 0 | 0 | 1 | 1 | | + | | | + | + | | |
| 1 | 0 | 0 | 0 | 1 | 0 | 1 | | + | | | + | | + | |
| 1 | 0 | 0 | 0 | 1 | 1 | 1 | | + | | | + | | | − |
| 1 | 0 | 0 | 1 | 0 | 0 | 1 | | + | | | | + | | |
| 1 | 0 | 0 | 1 | 0 | 1 | 1 | | + | | | | | + | |
| 1 | 0 | 0 | 1 | 1 | 0 | 1 | | + | | | − | | + | + |
| 1 | 0 | 0 | 1 | 1 | 1 | 1 | | + | | | − | | | |
| 1 | 0 | 1 | 0 | 0 | 0 | 1 | | | + | + | | + | + | |
| 1 | 0 | 1 | 0 | 0 | 1 | 1 | | | + | + | | | + | + |
| 1 | 0 | 1 | 0 | 1 | 0 | 1 | | | + | + | | | | + |

TABLE I—Continued

| Leading S bits of the denominator $d_1$=1 always | | | | | | | Required number of right shift adds or subtracts | | | | | | | |
|---|---|---|---|---|---|---|---|---|---|---|---|---|---|---|
| $d_2$ | $d_3$ | $d_4$ | $d_5$ | $d_6$ | $d_7$ | $d_8$ | 1 | 2 | 3 | 4 | 5 | 6 | 7 | 8 |
| 1 | 0 | 1 | 0 | 1 | 1 | 1 | | | + | + | | | − | |
| 1 | 0 | 1 | 1 | 0 | 0 | 1 | | | + | | + | + | | |
| 1 | 0 | 1 | 1 | 0 | 1 | 1 | | | + | | + | | | + |
| 1 | 0 | 1 | 1 | 1 | 0 | 1 | | | + | | | + | | + |
| 1 | 1 | 0 | 0 | 0 | 0 | 1 | | | + | | | | + | |
| 1 | 1 | 0 | 0 | 0 | 1 | 1 | | | + | | | | | |
| 1 | 1 | 0 | 0 | 1 | 0 | 1 | | | + | | | − | | + |
| 1 | 1 | 0 | 0 | 1 | 1 | 1 | | | | + | + | | + | |
| 1 | 1 | 0 | 1 | 0 | 0 | 1 | | | | + | + | | | |
| 1 | 1 | 0 | 1 | 0 | 1 | 1 | | | | + | | + | + | |
| 1 | 1 | 0 | 1 | 1 | 0 | 1 | | | | + | | + | | |
| 1 | 1 | 0 | 1 | 1 | 1 | 1 | | | | + | | | + | |
| 1 | 1 | 1 | 0 | 0 | 0 | 1 | | | | + | | | | − |
| 1 | 1 | 1 | 0 | 0 | 1 | 1 | | | | | + | + | | + |
| 1 | 1 | 1 | 0 | 1 | 0 | 1 | | | | | + | | + | + |
| 1 | 1 | 1 | 0 | 1 | 1 | 1 | | | | | + | | | + |
| 1 | 1 | 1 | 1 | 0 | 0 | 1 | | | | | + | | | + |
| 1 | 1 | 1 | 1 | 0 | 1 | 1 | | | | | | + | | + |
| 1 | 1 | 1 | 1 | 1 | 0 | 1 | | | | | | | + | + |
| 1 | 1 | 1 | 1 | 1 | 1 | 1 | | | | | | | | |

add again. Finally since the − is three places away from the previous entry, you shift three places and subtract. The results is the desired eight leading 1's. This information is used to form the standard form of $1+d_{(2)}$. Adder Block 400 and the standard form is also stored at register $MR_n(+)$ 301 and $MR_n(-)$ 302.

Referring now to FIG. 1 and 2, the data stored at the first adder 421 of the adder block 400 is controlled by $MR_n(+)$ 301, if the bit $n$ of $MR_N(+)$ is on, the right shift and add takes place, $1+d_2$ is incremented by $2^{-n}(1+d_2)$, and the sum is set to the next adder 422 via the data bus 411. If bit $n$ of the $MR_n(-)$ is on, the right shift and subtract takes place, the contents of 422 $(1+d_2)_+$is sent to register 423 via data bus 412 and also sent to third adder 424 via data bus 417. The leading bit of $(1+d_2)_f$ at register 423 is tested by any well-known zero test apparatus ZT. If the leading bit LB of 423 is zero, the contents of register 423 are sent to register 425 via data bus 416 and is the standard form of the denominator.

If the leading bit of $(1+d_2)_f$ is one, which represents that overfilling has occurred, the contents of the 423 are decremented by $2^{-8}(1+d_2)_f$, and the result is sent to register 425 via data bus 414. The contents of register 425 is the Standard form of the denominator, $1+d_{(2)}$. It is sent to the precision control unit 500 of FIG. 3 via data bus 415.

Referring now to FIG. 1 and 3, the first entity of the precision control unit is a shift register 500. The Precision Control Unit is used to develop a Precision Control Number. If only 16-bit precision is required, the precision control number is .5. If greater than 16-bit (i.e., 32, 64 ) is required, the Precision Control Unit should be used. When the number of precision bits is specified sat 32 bits, the leading 32 bits of the fraction portion $d_{(2)}$ of register 500 is set to the multiplier via data bus 530, and to shift register 502 via data bus 511. The contents of 502 is right shifted 2 places with its leading 2 bits set to one by well-known means and set to adder 503. At the same time the contents of 502 are complemented and 1 place right-shifted with its integer bit set equal to one and set to 602 of the reset stage via data bus 520. In the multiplier, the leading 32 bits of the fraction portion of the contents of register 500 are multiplied by its own complement. The product is right shifted 2 places and sent to adder 503 via data bus 540. The contents of adder 503 is added with this incoming data, the results is set to a shift register 504 via data us 513. The contents of register 504 is right shifted 1 bit and complemented, the result is stored at register 505. The contents of 505 is called $S_1$, the Precision Control Number, and sent to the Reset Unit 600 via data bus 515.

Referring now to FIGS. 1 and 4 there is seen the reset stage of my invention. The contents of registers 600 and 602 are sent to the multiplier via data bus 630. The product $Q_1$ decremented by $2^{-8} Q_1$ if the leading bit of register 423 was on as indicated by enable line 437. This new $Q_1$ is called $Q_{1m}$ (i.e., $Q_1$ modified to take into account the overfill situation) and is sent to the shift and adder 621 via data bus 640. When the register $MR_n(+)$ was on, the right shift and add takes place, $Q_{1m}$ is incremented by $Q_{1m}2^{-n}$, and the result $Q_2$ is sent to the next shift and adder 622 via data bus 611. If there was no overfill, the output can be gated by the complement of line 437 directly shift and add register 621. If the $MR_n(-)$ was on, $Q_2$ is decremented by $2^{-n}Q_2$ in 622. The result $Q_3$ is left shifted 1 place and set to register 623 via data bus 612. If $MR_n(-)$ was off, the contents of 621 $Q_2$, is left shifted 1 place and set to register 623 via data bus 615. These resets essentially readjust the outputs $Q_1$ or $Q_{1M}$ to take account of the original manipulation which was dictated by the table lookup to obtain the standard form of the denominator. The contents of 623, $Q_4$, is the reciprocal of the normalized fraction number $d_m$. In order to form the reciprocal of a number or the quotient of two numbers, $Q_4$ is sent to Q–R unit 700 via data bus 614. Referring now to FIG. 1, register $R_{T1}$100 held the normalized numerator's exponent and mantissa. The mantissa portion is sent to the multiplier via data bus 730, the exponent portion is sent to the quotient register 770 via data bus 750. Register $R_{T2}$101 held the normalized numerator's exponent and mantissa, the mantissa portion was used to generate the reciprocal is sent to the reciprocal register 780 via data line 760.

If only 16-bit precision were desired, the pass through the Precision Control Unit could have been eliminated and the contents of 602 could have been shifted right one place (i.e. $S_1'$=0.5) and used directly as an input to 624 (if overfill occurred) or to 621 (if no overfill occurred).

The Q-R unit contains two shift registers, the Quotient register 770, and the Reciprocal register 780. The incoming data $Q_4$ has been sent to two places, the multiplier via data bus 730 and the Reciprocal shift register 780. When the reciprocal of a number is requested, the contents of register 780 is right shifted $E_D$ places. The reciprocal of a number is thereby formed. When the quotient (Numerator/Denominator) is requested, the product of $Q_4$ and the mantissa of the numerator is sent to the quotient register 770 via data bus 740, and the contents of Quotient register is left shifted $E_{N-D}$ the quantity $(E_N-E_D)$ being formed by an adder such as A associated with register 770. The quotient of the two numbers is thus formed.

EXAMPLE

Find the Quotient of 2057/43701 with 32-bits precision. In binary, these numbers are represented as

N =100000001001

D =1010101010110101

After normalization-left justification, register $R_{T1}$100 holds $E_N$=12 $n_m$= 0.100000001001 register $R_{T2}$101 holds $E_D$=16 $d_m$= 0.1010101010110101 $2d_m$=1.010101010110101

The eight leading bits of $2d_m$ show as 1.0101010.The fraction portion is used as an entry to the table lookup via the data bus 111. The output of the table lookup gives the necessary right shift information. This information is stored at register $MR_n(+)$ *in this example* $MR_1(+)$ is on.

Referring to FIG. 1 and 2, the data $1+_2$ is added in adder 421 with $2^{-1}(1+d_2$ The result $(1+d_2)_+$ is 10.0000000000011111

Since $MR_n(-)$ is equal to zero, there is no operation in the second adder 422 and $(1+d_2)_f$ is equal to $(1+d_2)_+$ and sent to register 423 for testing its leading bit. Since the leading bit of register 423 is on, $(1+d_2)_f$ is sent to the third adder 424 via data bus 413. In adder 424, $1+d_{(2)}$ is formed by decrementing $(1+d_2)_f$ by $2^{-8}(1+d_2)_f$,

```
  10.0000000000011111
− 0.000000010000000000011111
  1.1111111000011111011100001
```

$1+d_{(2)}$ is sent to register 425 via data bus bus 414. After obtaining the standard form of $1+d_{(2)}$, refer to FIGS. 1 and 3. Since the specified precision bits are 32 bits, the leading 32 bits of the fraction portion $d_{(2)}$, namely:

0.1111111000011110111000010000—0 are sent to the multiplier via bus 530, and also stored at register 502 via bus 511. The contents of 502 is then right shifted 2 bits, with its leading 2 bits set to one. The number is then, 0.11111111100001111011100001000000

This number is held at register 503. The contents of register 500 is complemented and right shifted one bit with its integer bit set to one. This number shows, 1.0000000011110000100011111 and it is held at register 602 via bus 520. In the multiplier, where $d_2$ is multiplied by $d_2'$ (its complement) the product shows, $$\begin{array}{r} 0.1111111000011111011100001 \\ \times\ 0.0000000111100001000111111 \\ \hline 0.0000000111011101100101101100101 0 \end{array}$$

(only 32 leading bits are taken)

This data is right tow shifted bit and sent to adder 503. Adder 503 contains the following two numbers, 0.00000000011101110110010110110010 10

0.11111111100001111011100001 $2S_1$ is formed by adding these two numbers together, that is 0.111111111111111110001110111111001010 (only 32 leading bits are taken)

This data is sent to shift register 504 via data bus 513. The contents of 504 is then right shifted 1 bit, complemented, and sent to register 505 via data bus 514. The contents of register 505 is called the precision control number $S_1'$ Since the requested precision is 32 bits, the leading 32 bits of the contents of register 505 are, 0.1000000000000000011100010000011 1

This data is sent to register 600 of the Reset Unit via bus 515. Refer now to FIGS. 1 and 4. The contents of register 600 and 602 are shown as follows:

0.1000000000000000011100010000011

1.00000000111100001000111100—0

These two data are set to the multiplier via data bus 630, the product $Q_1$ is returned to shift and add register 624 via data bus 641. The product $Q_1$ is equal to 0.1000000001111000101110010011000100

Since the leading bit LB of register 423 was on, $Q_1$ is subtracted by $2^{-8} Q_1$, and the result $Q_{lm}$ is equal to 0.0111111111111100001000000001111000 (only 32 leading bits are collected)

$Q_{lm}$ is set to a shift and add register 621 via data bus 640. Since $MR_1(+)$ was on, $Q_{lm}$ is added with $2^{-1}Q_{1m}$, and the result $Q_2$ is equal to 0.1011111111111010001100000101101000

Since $MR_n(-)$ was off, therefore, $Q_3=Q_2$, the contents of register 621 is right shifted 1 bit and sent to register 623 via data line 615. The contents of register 623 is the reciprocal of the normalized fraction number $Q_4$ and is equal to 1.0111111111101000110000010110100 00.

This data is sent to Q-R via data bus 614 to the reciprocal shift register 780, and to the multiplier via data bus 730.

The reciprocal of $d_m$ is obtained by shifting $Q_4$ right 16 bits. That is 0.0000000000000000101

1111111111010001100000101101000

Which is 0.00002288277 in decimal.

when the quotient of a division is requested, $Q_4$ along with $n_m$ are sent to the multiplier via data bus 730. The product is returned to the Quotient register 770 via data bus 740. The product is equal to 0.1100000011001100010100111010000011 0

The quotient is obtained by shifting this data left $E_N-E_D$ places, in this case, $E_N-E_D$ equal to −4. Therefore, the shifting is toward the reverse direction, that is toward the right 4 places. The quotient of $N/D$ is 0.0000110000001100110001010011101000000110010101 which is 0.0470698611 in decimal.

As a time saving device, if it is determined, by well known testing means, that $1+d_{(2)}$ already has 16 leading one's, then the Precision Control Unit calculation can be skipped, thus saving one multiplication.

The above detailed example was for 32-bit precision. If only 16-bit precision were desired, the pass through the Precision Control Unit could be eliminated as described above. On the other hand if $N$·32-bit precision were desired, $n$ passes through the Precision Control Unit should be made before proceeding to the reset stage. This can be seen by equation 6.$n$.

Further, if only eight-bit precision were desired, only 4 leading zeros would be required for the standard form 1.111 ---. In this case the table lookup could be replaced by a simple logic implementation based on the table

| $\delta_2\ \delta_3\ \delta_4$ | 1 | 2 | 3 | 4 |
|---|---|---|---|---|
| 0 0 0 | + | + | | |
| 0 0 1 | + | | + | |
| 0 1 0 | + | | | |
| 0 1 1 | | + | + | |
| 1 0 0 | | + | | |
| 1 0 1 | | | + | + |
| 1 1 0 | | | + | |
| 1 1 1 | | | | |

Thus $MR_1$ would be $$MR_1=d_2'd_3'4'+d_2'd_3'd_4+d_2'd_3d_4'$$

$$MR_1=d_2'd_3'+d_2'd_3d\,4'$$

Similarly $$MR_2=d_3'd_4'+d_2'd_3d_4$$

$MR_3$ and $MR_4$ can be similarly derived.

While the invention has been particularly shown and described with reference to a preferred embodiment thereof, it will be understood by those skilled in the art that various changes inform and details may be made therein without departing from the spirit and scope of the invention.

What is claimed is:

1. The method of obtaining electrical signals represent the reciprocal of a number D comprising the steps of:
   1. calculating electrical signals representing the left justified mantissa of $D$, $d_m$;
   2. adjusting said electrical signals representing said justified mantissa to obtain electrical signals representing a standard form of the number containing a desired number of leading one bits, said standard form having a fraction portion
   3. calculating electrical signals representing a precision control number;
   4. calculating electrical signals represent the quantity one pulse one-half the complement of said fraction portion of said standard form;
   5. multiplying said electrical signals representing said quantity by said electrical signals representing said precision control number to obtain electrical signals representing the bits of the reciprocal to a desired precision; and
   6. shifting said electrical signals representing the bits of the reciprocal to account for the original left justification of said mantissa.

2. The method of claim 1 further including the step of multiplying said shifted electrical signals representing the bits of the reciprocal by a number $N$ to obtain the quotient of $N$ divided by $D$.

3. Apparatus for obtaining the reciprocal of a left-justified number $D$, comprising in combination;

inspection means for inspecting certain bits of the mantissa $d_m$ of said number $D$ and supplying information defining the mathematical calculation necessary to transform said mantissa into a standard form having a desired number of leading 1 bits, said standard form having a fraction portion;

first arithmetic means connected to said inspection means, including shift and addition means, for performing said defined mathematical calculation on said mantissa;

precision control means connected to said first arithmetic means for calculating a precision control number as a function of said standard form;

said arithmetic means for calculating the quantity one plus one-half the complement of the fraction portion of the standard form; and multiplication means for multiplying said precision control number by the quantity one pulse one-half the complement of the fraction portion of the standard form to obtain the bits of the reciprocal to the desired precision.

4. The combination of claim 3 further including means for adjusting said bits of said reciprocal to account for said left justification to obtain the desired reciprocal.

5. The combination of claim 3 further including means for multiplying a number $N$ by the bits of the reciprocal to obtain the quotient $N/D$.

* * * * *

PO-1050
(5/69)

UNITED STATES PATENT OFFICE
CERTIFICATE OF CORRECTION

Patent No. 3,633,018 Dated January 4, 1972

Inventor(s) Huei Ling

It is certified that error appears in the above-identified patent and that said Letters Patent are hereby corrected as shown below:

Col. 2, line 42, the portion of the equation "$(.\delta\ b2\ \delta_3 \ldots \delta_n)$" should read --$(.\delta_2 \delta_3 \ldots \delta_n)$--; line 48, after $\delta_n)$ insert --.--.

Col. 3, line 22, the portion of the equation "$[f(d_{(2)}]$" should read --$[f(d_{(2)})]$--; line 33, the portion of the equation "$f(d_{(1)})$" should read --$f(d_{(2)})$--; line 50, "(2.2" should read --(2.2)--; after line 66 the following equation should appear:

$$-- \quad \frac{2S_2}{1+d_{(2)}} = \frac{2S_1}{1+d_{(2)}} \cdot 2S_1' \text{ where } S_1' = 1-S_1 \qquad (6.1) --.$$

Col. 4, after line 2, insert --We obtain:--; line 23, the portion of the equation "$(1+d_{(2)}$," should read --$(1+d_{(2)})$, --; line 47, "Equation" should be --Equations--; line 70, "written" should be --rewritten--.

Col. 8, line 55, "$1+_2$" should read --$1+d_2$--; line 56 "$(1+d_2$ The" should read --$(1+d_2)$. The--.

Col. 9, line 30, after the final 1 add --1--; line 32, "set" should be --sent--; line 41, "set" should be --sent--.

Col. 10, line 28, "represent" should be --representing--; line 40, "represent" should be --representing.

Signed and sealed this 4th day of July 1972.

(SEAL)
Attest:

EDWARD M. FLETCHER, JR.
Attesting Officer

ROBERT GOTTSCHALK
Commissioner of Patents